(12) United States Patent  (10) Patent No.: US 7,105,247 B2
Suzuki  (45) Date of Patent: Sep. 12, 2006

(54) BATTERY HOLDING METHOD AND STRUCTURE

(75) Inventor: Shinji Suzuki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 456 days.

(21) Appl. No.: 10/298,910

(22) Filed: Nov. 19, 2002

(65) Prior Publication Data

US 2003/0096159 A1  May 22, 2003

(30) Foreign Application Priority Data

Nov. 21, 2001  (JP) .............................. 2001-355812

(51) Int. Cl.
*H01M 2/10* (2006.01)
(52) U.S. Cl. .......................................... 429/96; 429/99
(58) Field of Classification Search .................. 429/99, 429/96, 100
See application file for complete search history.

(56) References Cited

U.S. PATENT DOCUMENTS 4,993,973 A * 2/1991 Selinko ...................... 439/627

5,290,639 A * 3/1994 Mallory ......................... 429/1

FOREIGN PATENT DOCUMENTS

| JP | 63-18766 | 2/1988 |
|---|---|---|
| JP | 63-28523 | 8/1988 |
| JP | 1-122258 | 8/1989 |
| JP | 1-260756 | 10/1989 |
| JP | 60-42230 | 2/1993 |

* cited by examiner

*Primary Examiner*—Patrick Joseph Ryan
*Assistant Examiner*—Thomas H. Parsons
(74) *Attorney, Agent, or Firm*—Sughrue Mion, PLLC (57) ABSTRACT

The battery holding method and structure enable contact points between a battery and terminals to be maintained invariant in location by improving a performance in holding the battery, and accordingly a stable contact resistance can be obtained. A battery holder forms a battery chamber, and the battery chamber makes a space for housing a battery inserted along a lengthwise direction thereof. The battery holder is equipped, on a side surface thereof, with a nail for pressing the battery in touch with the side surface of the battery. When the battery is inserted into the battery chamber, the nail is deformed elastically, and the resulting restoring force thereof fixes the battery in a definite arrangement in the battery chamber with a slight and eccentric displacement.

10 Claims, 8 Drawing Sheets

RELEASE

FIG.5(b)

LOCK

FIG.6(a)   RELEASE

FIG.6(b)   LOCK

FIG.7

FIG.8(b) BATTERY CHAMBER CAP CLOSED

FIG.8(a) BATTERY CHAMBER CAP OPENED

FIG.9

FIG.10(b)
BATTERY CHAMBER CAP CLOSED

FIG.10(a)
BATTERY CHAMBER CAP OPENED

BATTERY HOLDING METHOD AND STRUCTURE

BACKGROUND OF THE INVENTION

1. Field of the Invention

The present invention relates to a battery holding method and structure, and particularly to a battery holding method and structure applied to such appliances as cameras or the like.

2. Description of the Related Art

In these years, downsizing of digital cameras has been promoted, and accordingly the battery downsizing and reduction in required number of batteries become critical factors for commercialization. On the other hand, there exists strong market demand for longer service life of batteries, and hence the power saving performance and the reduced contact resistance are now essential challenge in developing commercial products. In relation to the battery holding method and structure, Japanese Utility Model Publication No. 63-28523 and Japanese Patent Application Publication 1-260756 disclose battery holding devices which fix the batteries without play.

However, the structures proposed in the above publications cannot be applied to a battery housing unit having a bottomed tubular battery chamber into which the battery is dropped along the lengthwise direction of the chamber. In a type of battery holder in which the battery is inserted along the lengthwise direction of the holder, conventionally only the forces exerted by the energized terminal clamps abutting to the top and bottom ends of the battery hold the battery. The tolerance for the battery outer diameter is large (for example, 14±0.5 mm in diameter for the size AA battery according to Japanese Industrial Standards), and hence a clearance is usually provided to such a battery chamber (a battery case). Accordingly, when the conventional method is applied in which only the end terminal clamps hold the battery, there occurs a problem that the battery moves within an extent of clearance between the battery and the inner wall of the battery chamber, rotates on the lengthwise axis thereof, or the like, and hence the contact points between the battery and the terminals are varied to make the relevant contact resistance unstable.

SUMMARY OF THE INVENTION

The present invention has been achieved in consideration of the above circumstances, and an object of the present invention resides in the provision of battery holding method and structure which make it possible to stabilize the contact resistance between the battery and the terminals by improving the battery holding performance in such a way that the contact points between the battery and the terminals are made steady in location.

To attain the above-described object, the present invention is directed to a battery holding method, wherein a battery is inserted along a lengthwise direction of the battery into a battery housing chamber, and the battery is held in a definite arrangement in the battery housing chamber by applying a force to the inserted battery along a direction perpendicular to the lengthwise direction of the battery.

According to the present invention, in the battery housing unit in which the battery is inserted into the battery housing chamber along the lengthwise direction thereof, the battery is fixed in arrangement by applying a force to the battery along the transverse direction perpendicular to the lengthwise direction (the insertion direction), and hence the contact points between the battery and the terminals can be steady in location and consequently the relevant contact resistance can be stabilized. In this manner, it is possible to improve the fluctuating battery life due to the individual differences in appliances themselves and those in batteries.

To attain the above-described object, the present invention is also directed to a battery holding structure, comprising: a battery holder which has a battery housing chamber which permits insertion and removal of a battery along a lengthwise direction thereof; and a battery fixing device which restrains the battery in a definite arrangement in the battery housing chamber by applying a force to the battery inserted into the battery housing chamber along a direction perpendicular to the lengthwise direction.

Preferably, the battery fixing device includes a battery pressing member which exerts a force to a side surface of the battery in the battery housing chamber along the direction perpendicular to the lengthwise direction so as to press and fix the battery to an inner wall of the battery housing chamber.

Preferably, the battery pressing member is formed on a side surface portion of the battery holder made of resin as a resin spring integrated with the battery holder; and the pressing member undergoes elastic deformation caused by a battery insertion into the battery housing chamber, and a restoring force of the pressing member presses the side surface of the battery.

Preferably, the battery holder is provided with a battery chamber cap to open and close an insertion opening of the battery housing chamber; the battery chamber cap has a structure in which the battery chamber cap is adapted to be locked and released by sliding the battery chamber cap along a definite direction; the battery chamber cap has, on an interior surface thereof as the fixing device, a holding member for pressing an edge of the battery; and the sliding movement of the battery chamber cap permits for the battery chamber cap to take a locking position in which the holding member holds the battery, and a releasing position in which the holding member releases the battery.

Preferably, a link lever is provided as a fixing device which presses a side surface of the battery in conjunction with the battery insertion operation.

Preferably, the pressing member constituting the fixing device is arranged in a freely rotatable manner on the side surface portion of the battery holder; and the fixing device has a mechanism which displaces the pressing member to the releasing position and the locking position in conjunction with opening and closing operations of a battery chamber cap which is provided to open and close an insertion opening of the battery housing chamber.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a battery holding method related to the present invention will be described below with reference to the attached drawings.

First Embodiment

Figure 1:
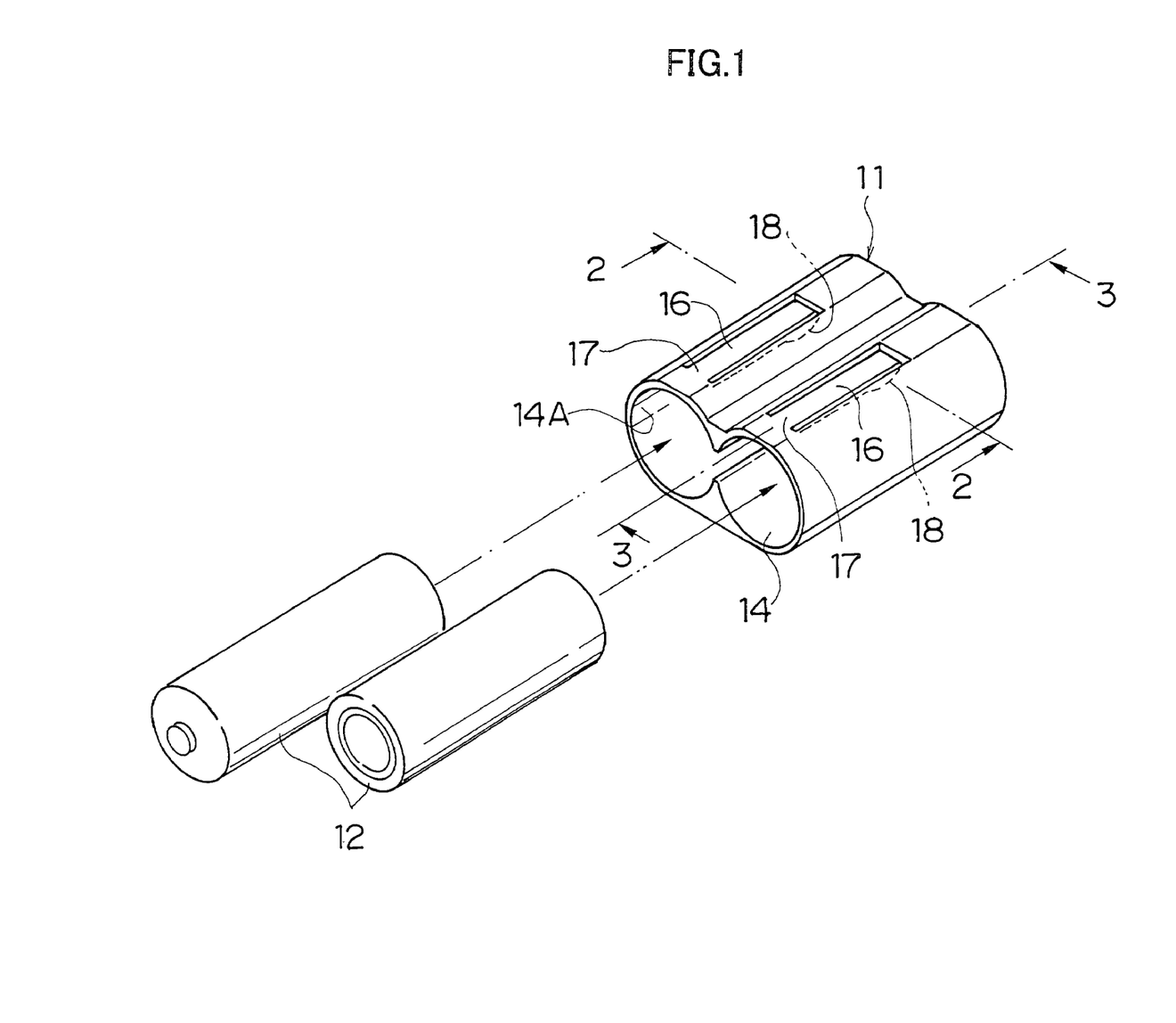
FIG. 1 is a perspective view illustrating a battery holding structure related to the first embodiment of the present invention.

FIG. 1 is a perspective view illustrating a battery holding structure according to a first embodiment of the present invention. In FIG. 1, a battery holder 11 is provided with a battery chamber 14, which can house two size AA batteries 12 side by side, and nails 16 for pressing side surfaces of the batteries 12 are arranged on a side portion of the holder 11. The nails 16 and the battery holder 11 are made of resin in an integrated form, and the nails 16 function as resin springs capable of swinging with root end portions 17 as supporting points. A lengthwise direction of the nails 16 is parallel to an insertion direction for the batteries 12, and the root end portions 17 are arranged on positions upstream of the insertion direction for the batteries 12 (the positions nearer to an insertion opening 14A of the battery chamber 14 rather than the bottom of the battery chamber 14). The head portions of the nails 16 are provided with pads 18 abutting to the side surface of the batteries 12. In the present invention, the shape and number of the batteries 12 are not limited to the example shown in FIG. 1.

Figure 2:
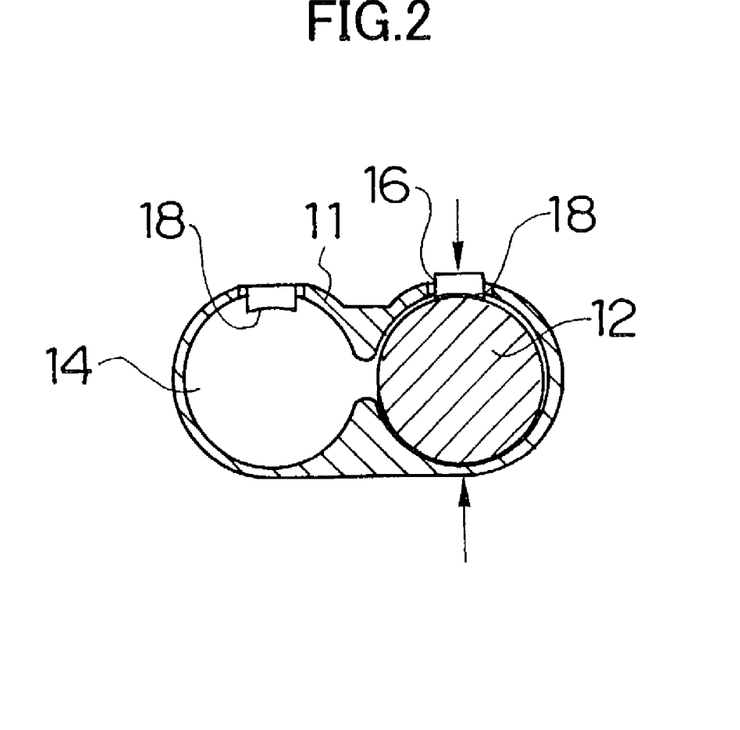
FIG. 2 is a sectional view along a line 2—2 in FIG. 1.
Figure 3:
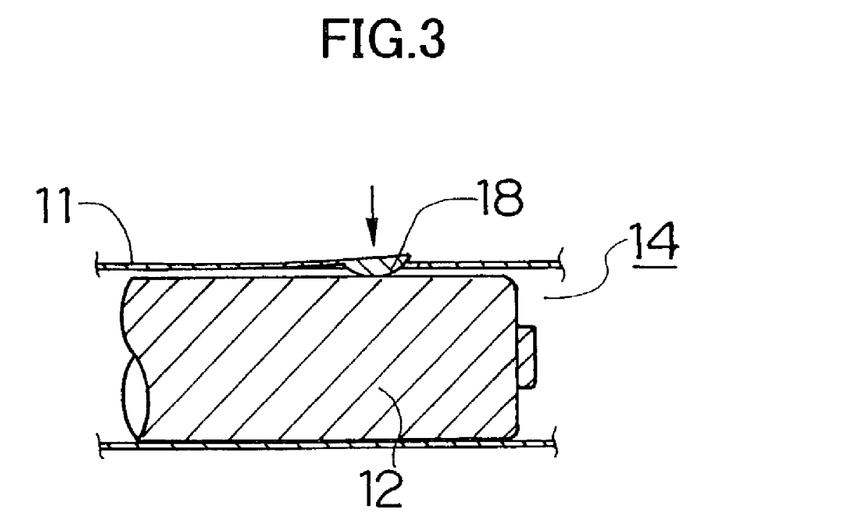
FIG. 3 is a sectional view along a line 3—3 in FIG. 1.

FIG. 2 is a sectional view along a line 2—2 in FIG. 1, and FIG. 3 is a sectional view along a line 3—3 in FIG. 1. As shown in these drawings, an inner diameter of each tubular portion of the battery chamber 14 is slightly larger than an outer diameter of the battery 12 in consideration of the tolerance for the outer diameter of the battery 12. When there is no battery inserted, the pad 18 slightly protrudes to an interior space of the battery chamber 14 (see the left-hand half of FIG. 2), while when the battery 12 is inserted into the battery chamber 14 (see the right-hand half of FIG. 2), the side surface of the battery 12 comes into contact with the pad 18, and the nail 16 is pressed upward in FIG. 2. The thus elastically deformed nail 16 presses the battery 12 along the radial direction of the battery 12 (in the downward direction in FIG. 2) through the restoring force thereof. The battery 12 is held by the point of the pad 18 abutting to the battery 12 and by the portion of the inner wall of the battery chamber 14 which portion opposes to that point, as illustrated with arrows in FIG. 2.

According to the first embodiment illustrated in FIGS. 1 to 3, the insertion operation of the battery 12 elastically deforms the nail 16, and the force exerted by the nail 16 holds the battery 12 in the interior of the battery chamber 14 in a state of being pressed to one side of the chamber (the under side in either of FIGS. 2 and 3). Consequently, the battery 12 is fixed in a definite arrangement in the battery chamber 14, and hence the contact points between the battery connection terminals (not shown) and the battery 12 can be maintained invariant in location and thereby the contact resistance can be stabilized.

Second Embodiment

Figure 4:
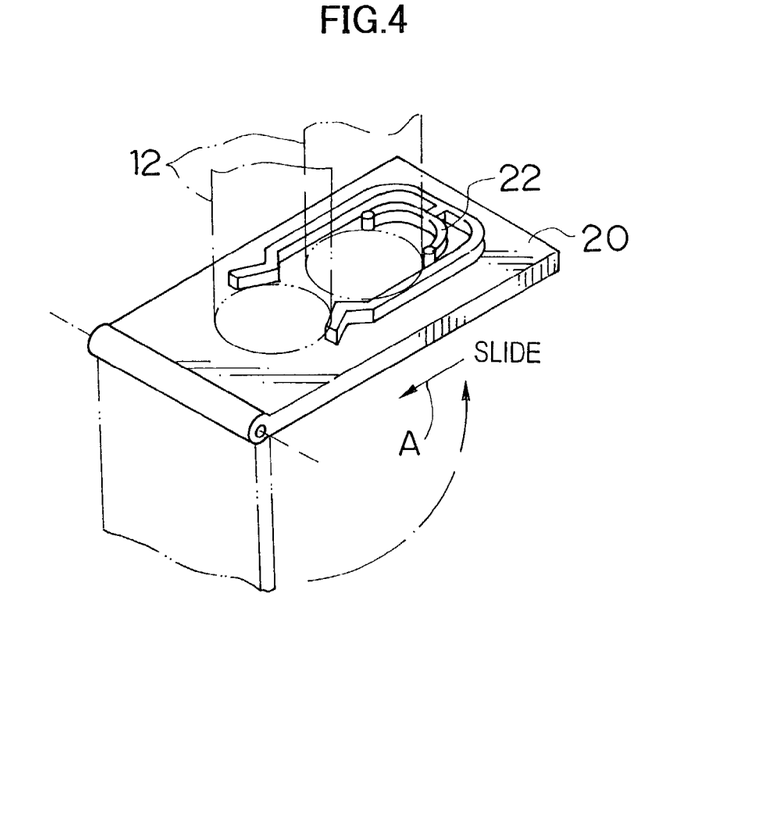
FIG. 4 is a perspective view illustrating a relevant portion of a battery holding structure related to the second embodiment of the present invention.

FIG. 4 is a perspective view illustrating a relevant portion of a battery holding structure according to a second embodiment of the present invention. In the example shown in FIG. 4, a holding member 22 for fixing the batteries 12 is arranged on an interior surface of a battery chamber cap 20. The battery chamber cap 20 is arranged in the body or the battery holder of an electric appliance (not shown) in a freely rotatable and free in sliding displacement manner. When the battery chamber cap 20 is opened or closed by sliding, a latch mechanism (not shown) of the battery chamber cap 20 can lock or release the battery chamber cap 20. The sliding movement of the battery chamber cap 20 makes the holding member 22 press the edges of the batteries 12, in touch with the side surfaces of the batteries 12, along the radial direction of the batteries 12 (along the sliding direction indicated with an arrow A in FIG. 4), to fix the batteries 12 with a slight eccentric displacement.

Figure 5A:
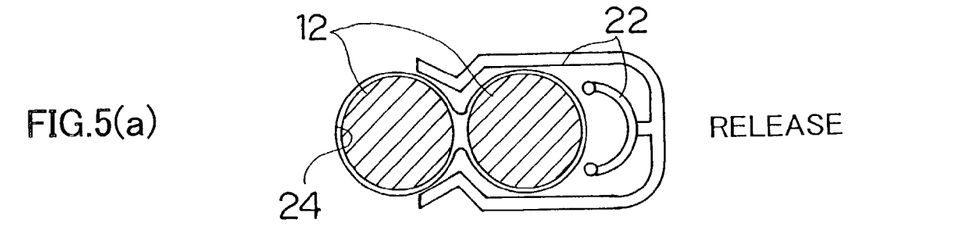
FIG. 5(a) is a plan view illustrating a released state of a battery.
Figure 5B:
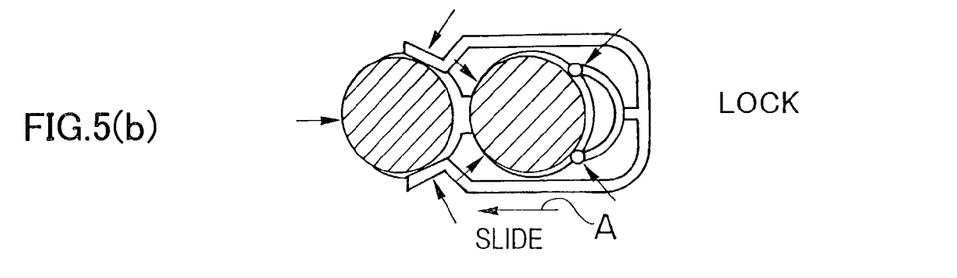
FIG. 5(b) is a plan view illustrating a locked state of the battery.

FIG. 5(a) is a plan view illustrating a released state of the batteries 12, and FIG. 5(b) is a plan view illustrating a locked state of the batteries 12. As is shown in FIG. 5(a), in the released state, the holding member 22 is not in contact with the batteries 12, so that the batteries 12 are freely movable in the battery chamber 24. When the battery chamber cap 20 is slid to the left-hand side in FIG. 5(a), as shown in FIG. 5(b), the holding member 22 abuts to the edges of the batteries 12, and the batteries 12 are fixed in a state of being pressed to one side (the left-hand side in FIG. 5(b)) in the battery chamber 24. The arrows in FIG. 5(b) indicate the holding points of the batteries 12.

Third Embodiment

Figure 6A:
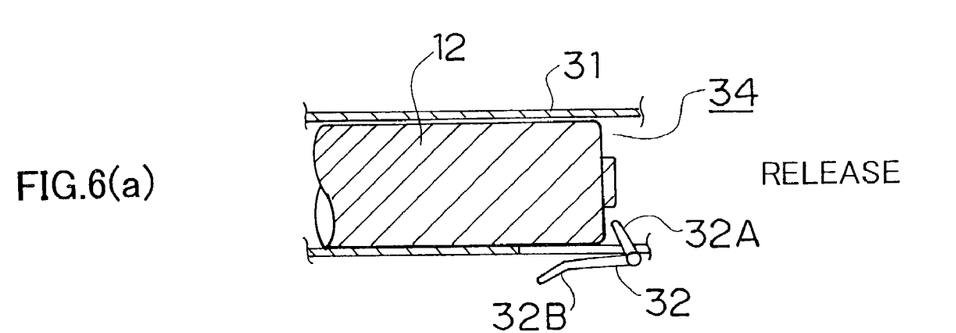
FIGS. 6(a) and 6(b) are sectional views of a relevant portion of the battery holding structure related to the third embodiment of the present invention.
Figure 6B:
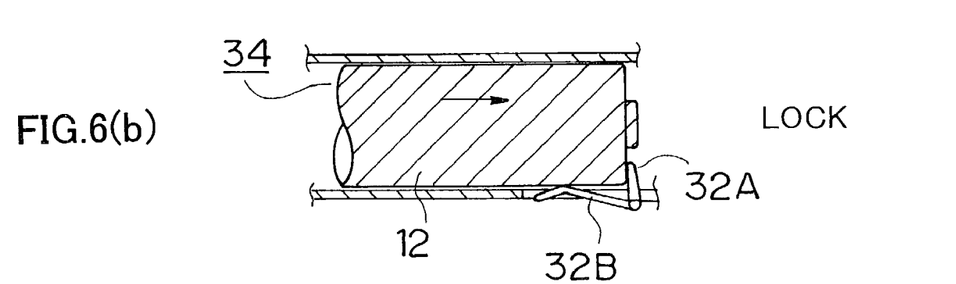

FIGS. 6(a) and 6(b) are sectional views of a relevant portion of a battery holding structure according to a third embodiment of the present invention. FIG. 6(a) shows a released state, and FIG. 6(b) a locked state. In the example shown in FIG. 6, a battery holder 31 is provided with a link lever 32 on the side surface thereof. The link lever 32 has a nearly L-shaped form, and its apex portion is supported with a shaft. When the battery 12 is inserted to a battery chamber 34, a top end face of the battery 12 presses the shorter component 32A of the link lever 32 to turn the link lever 32 clockwise in FIG. 6(a) and consequently the longer component 32B presses the battery 12 in touch with the side surface of the battery as shown in FIG. 6(b). In this manner, the battery 12 is pressed upward in FIG. 6(b), and is fixed in the battery chamber 34 in a state of being slightly and eccentrically displaced upward. When the battery 12 is removed from the battery chamber 34, the link lever 32 is turned counterclockwise in FIG. 6(b) to lift the locked state. A combination of the above described second and third embodiments is also a possible embodiment.

Fourth Embodiment

Figure 7:
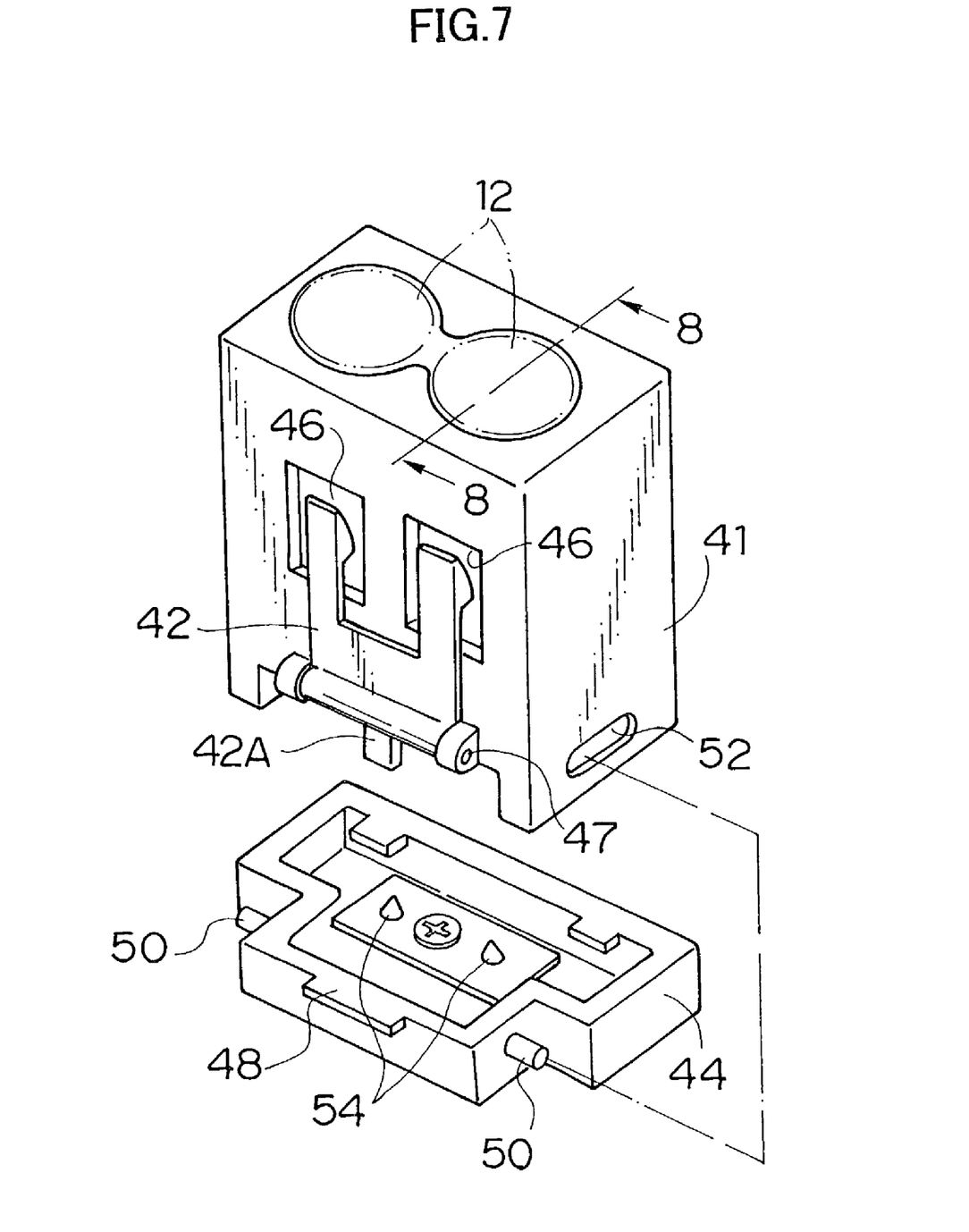
FIG. 7 is a perspective view illustrating a relevant portion of the battery holding structure related to the fourth embodiment of the present invention.

FIG. 7 is a perspective view illustrating a relevant portion of a battery holding structure according to a fourth embodiment of the present invention. The example shown in FIG. 7 has a structure in which a battery holder 41 is provided with a nearly U-shaped presser lever 42 on the side surface of the battery holder 41, and the presser lever 42 takes the releasing position and the locking position respectively in conjunction with the opening and closing of a battery chamber cap 44. Openings 46 are formed on the side surface of the battery holder 41, and the top portions of the presser lever 42 can abut to the side surfaces of the batteries 12 through the openings 46. A rotary shaft 47 of the presser lever 42 is borne by the side surface of the battery holder 41 in a rotatable manner, and a tongue portion 42A is formed to work as a power point at another end of the presser lever 42 (the bottom end in FIG. 7).

In a rear end portion of the battery chamber cap 44, there is formed a protrusive portion 48 which can exert a force to the tongue portion 42A of the presser lever 42. A shaft 50 in the battery chamber cap 44 is inserted with play into a slot 52 in the bottom portion of the battery holder 41, so that the battery chamber cap 44 can be turned about the shaft 50 and in addition can be slid along the lengthwise direction of the slot 52. A metal plate of battery connection terminals 54 is mounted on the interior surface of the battery chamber cap 44.

Figure 8A:
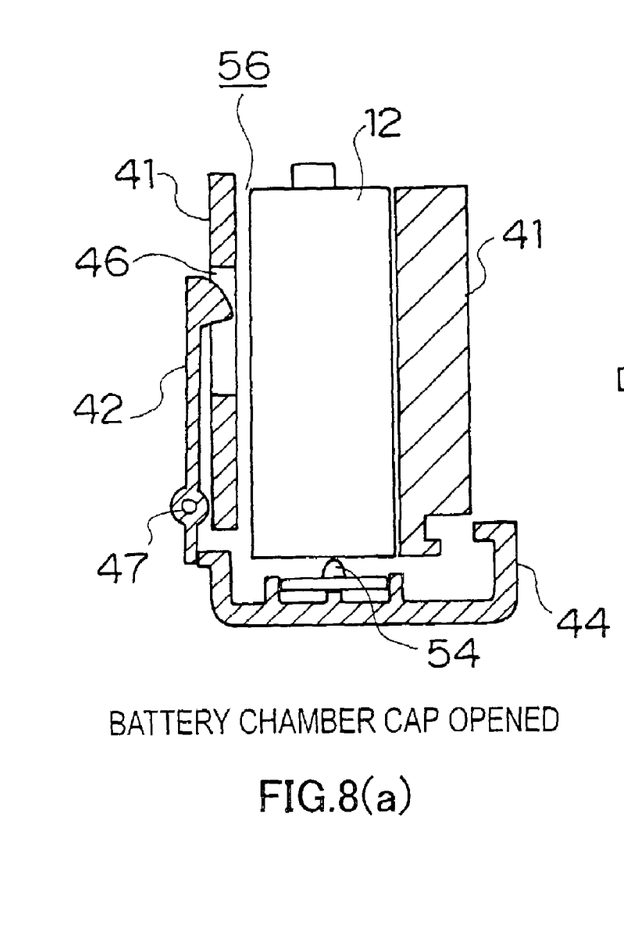
FIGS. 8(a) and 8(b) are sectional views along a line 8—8 in FIG. 7.
Figure 8B:
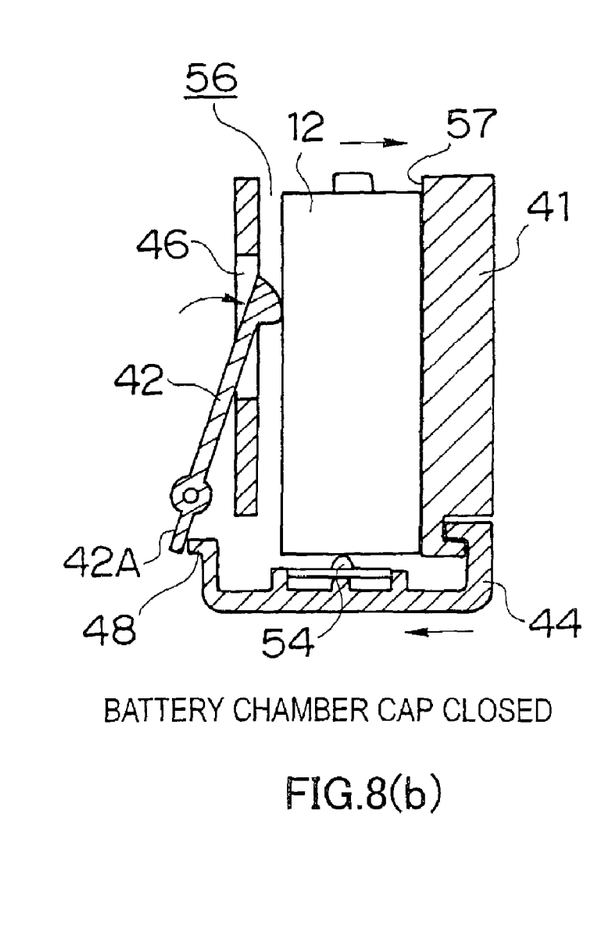

Now, description is made on an operation of the battery holding structure shown in FIG. 7. FIGS. 8(a) and 8(b) are sectional views along a line 8—8 in FIG. 7. As FIG. 8(a) shows, in an opened state of the battery chamber cap 44, the presser lever 42 takes an escape position (releasing position) where the presser lever 42 does not abut to the battery 12. When the battery chamber cap 44 is slid to the left-hand side in FIG. 8(a) to close the battery chamber cap 44, as is shown in FIG. 8(b), the protrusive portion 48 of the battery chamber cap 44 presses the tongue portion 42A of the presser lever 42. Consequently, the presser lever 42 is turned clockwise about the rotary shaft 47 in FIG. 8(a), and presses the battery 12 along the radial direction of the battery 12 (to the right-hand direction in FIG. 8(b)). The battery 12 is pressed to a wall 57 (the inner wall of the battery holder 41) of a battery chamber 56 by the operation of the presser lever 42, and fixed with a slight and eccentric displacement.

The presser lever 42 is energized toward the escape position by an energizing device (not shown) such as a spring or the like, so that when in the locked state shown in FIG. 8(b) the battery chamber cap 44 is opened, the presser lever 42 is restored to the escape state shown in FIG. 8(a) by the force exerted by the energizing device.

Although the sliding direction of the battery chamber cap 44 and the battery 12 pressing direction of the presser lever 42 are parallel to each other in the structure described with reference to FIGS. 7, 8(a) and 8(b), the exploitation of the present invention is not limited to the structure of the present example.

Fifth Embodiment

Figure 9:
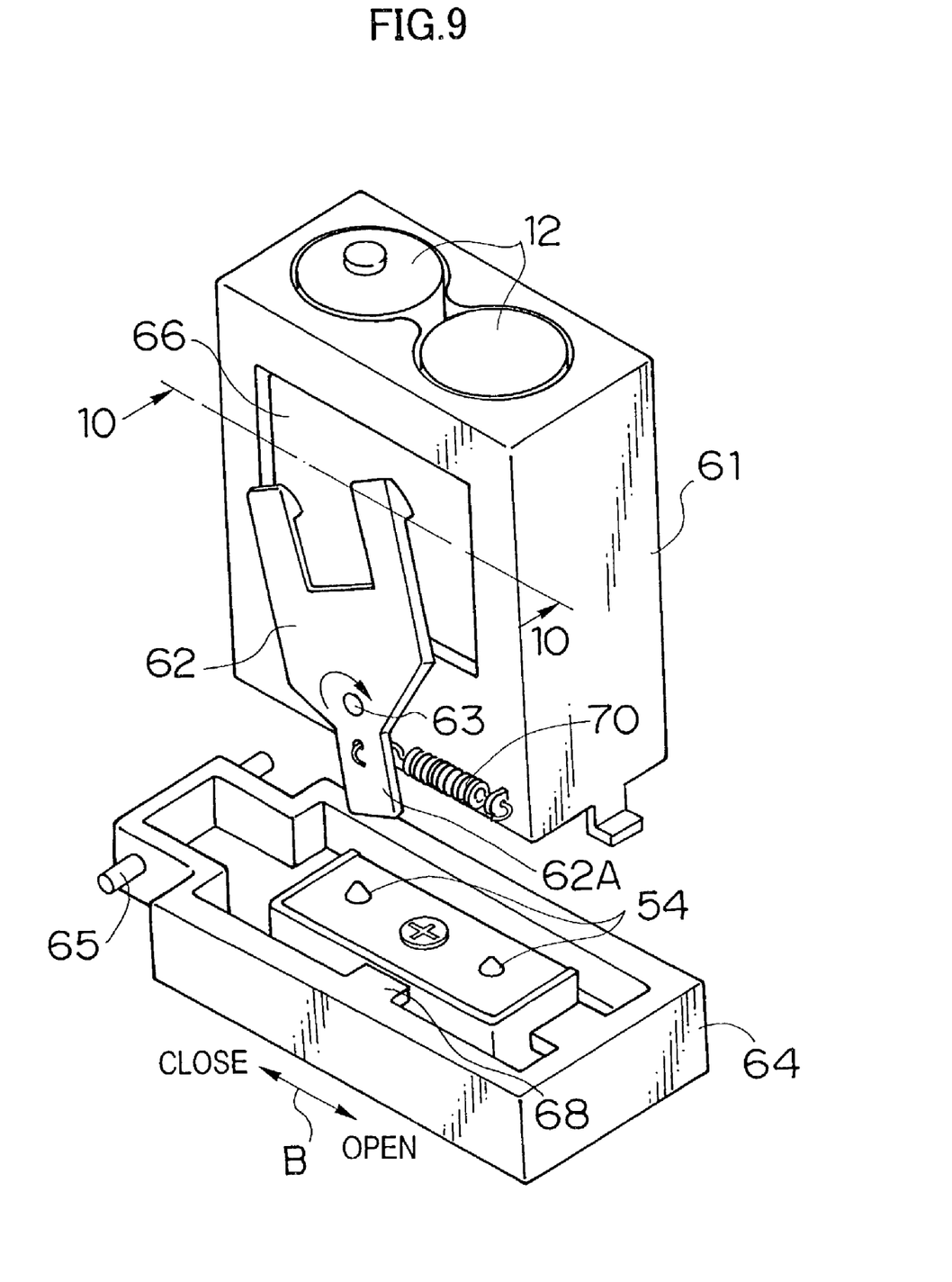
FIG. 9 is a perspective view of a relevant portion of the battery holding structure related to the fifth embodiment of the present invention.

FIG. 9 is a perspective view illustrating a relevant portion of a battery holding structure according to a fifth embodiment of the present invention. FIG. 9 shows an example of a type in which a sliding direction of a battery chamber cap and a battery pressing direction of a presser lever are perpendicular to each other. To be more specific, a battery holder 61 is provided with a rotary shaft 63 of a presser lever 62 on the side surface thereof, and the presser lever 62 can be turned on the side surface of the battery holder 61. On the other hand, a battery chamber cap 64 can be freely slid along directions of an arrow B in FIG. 9, and can be turned counterclockwise in FIG. 9 about a shaft 65 in the opened state. On the interior surface of the battery chamber cap 64, a protrusive portion 68 is formed which exerts a force to a tongue portion 62A of the presser lever 62. When the battery chamber cap 64 is slid to a closing direction, the protrusive portion 68 presses the tongue portion 62A of the presser lever 62 along the same direction. By this movement, the presser lever 62 is turned clockwise in FIG. 9, and presses the side surfaces of the batteries 12 through an opening 66.

The presser lever 62 is energized by a coil spring 70 toward the escape position (the counterclockwise direction in FIG. 9), so that when the battery chamber cap 64 is slid to the opening direction, the presser lever 62 is restored to the previous escape state owing to the force exerted by the coil spring 70.

Figure 10A:
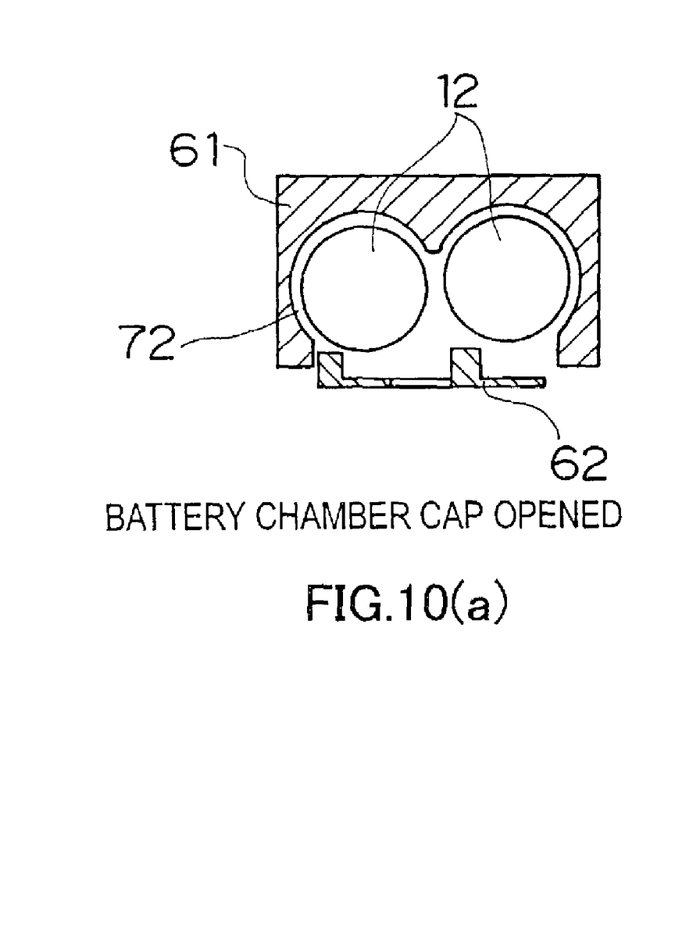
FIGS. 10(a) and 10(b) are sectional views along a line 10—10 in FIG. 9.
Figure 10B:
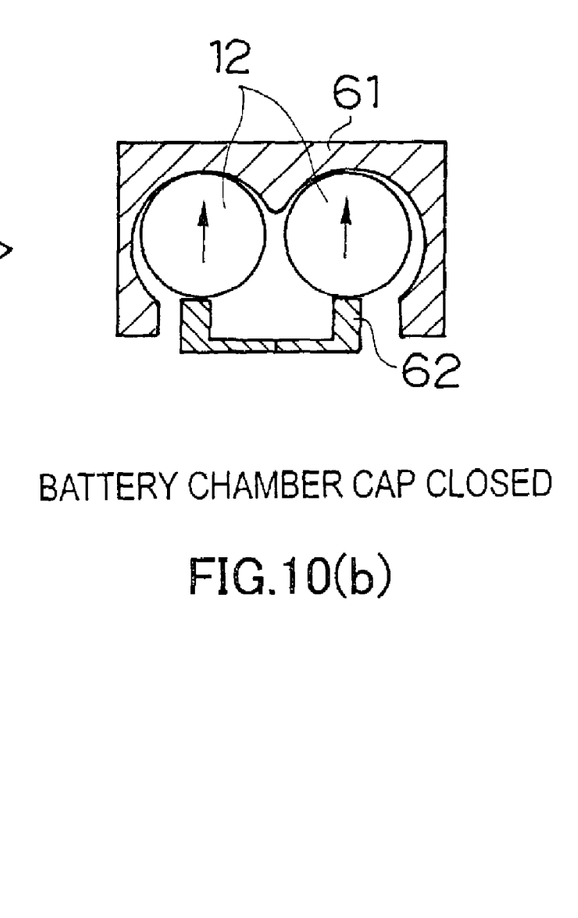

FIGS. 10(a) and 10(b) are sectional views along a line 10—10 in FIG. 9. As FIG. 10(a) shows, in the opened state of the battery chamber cap 64, the presser lever 62 takes the escape position (releasing position), where the batteries 12 can move freely in a battery chamber 72. When the battery chamber cap 64 is closed, as FIG. 10(b) shows, the presser lever 62 is turned to press the batteries 12 along the radial direction thereof (the upward direction in FIG. 10). In this manner, the batteries 12 are pressed to the inner wall of the battery chamber 72, and held with a slight and eccentric displacement.

According to the above described first to fifth embodiments, for the purpose of battery holding there is adopted a structure in which the battery is held with several holding points (for example, 2 to 3 points), and hence there is eliminated the displacement and rotation of the battery in the battery chamber, and it becomes possible to make the contact points with the terminals invariant, which prevents the contact resistance from fluctuating.

As described above, according to the present invention, in the battery housing unit in which the battery is inserted into the battery housing chamber along the lengthwise direction thereof, the battery is fixed in arrangement by applying a force to the battery along the transverse direction perpendicular to the lengthwise direction (the insertion direction), and hence the contact points between the battery and the terminals can be made invariant in location and consequently the relevant contact resistance can be stabilized. In this manner, it is possible to improve the fluctuating battery life due to the individual differences in appliances themselves and those in batteries.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A battery holding method, wherein a battery is inserted along a lengthwise direction of the battery into a battery housing chamber, and the battery is held in a definite arrangement in the battery housing chamber by applying a force to the inserted battery along a direction perpendicular to the lengthwise direction of the battery and wherein the force is applied in conjunction with the insertion of the battery into the battery housing chamber.

2. A battery holding structure, comprising:
   a battery holder which has a battery housing chamber which permits insertion and removal of a battery along a lengthwise direction thereof; and
   a battery fixing device which restrains the battery in a definite arrangement in the battery housing chamber by applying a force to the battery inserted into the battery housing chamber along a direction perpendicular to the lengthwise direction;

wherein the battery fixing device presses a side surface of the battery in conjunction with a battery insertion operation.

3. The battery holding structure according to claim 2, wherein the battery fixing device comprises a link lever.

4. The battery holding structure according to claim 2, wherein the battery fixing device includes a battery pressing member and the battery pressing member exerts the force to the side surface of the battery in the battery housing chamber along the direction perpendicular to the lengthwise direction so as to press and fix the battery to an inner wall of the battery housing chamber.

5. The battery holding structure according to claim 4, wherein the battery fixing device comprises a link lever.

6. The battery holding structure according to claim 2, wherein:

the battery holder is provided with a battery chamber cap to open and close an insertion opening of the battery housing chamber;

the battery chamber cap has a structure in which the battery chamber cap is adapted to be locked and released by sliding the battery chamber cap along a definite direction;

the battery chamber cap has, on an interior surface thereof, a holding member for pressing an edge of the battery; and the sliding movement of the battery chamber cap permits for the battery chamber cap to take a locking position in which the holding member holds the battery, and a releasing position in which the holding member releases the battery.

7. The battery holding structure according to claim 6, wherein the battery fixing device comprises a link lever.

8. A battery holding structure, comprising:

a battery holder which has a battery housing chamber which permits insertion and removal of a battery along a lengthwise direction thereof; and a battery fixing device which restrains the battery in a definite arrangement in the battery housing chamber by applying a force to the battery inserted into the battery housing chamber along a direction perpendicular to the lengthwise direction;

wherein the battery fixing device includes a battery pressing member and the battery pressing member exerts the force to the side surface of the battery in the battery housing chamber along the direction perpendicular to the lengthwise direction so as to press and fix the battery to an inner wall of the battery housing chamber;

wherein the pressing member undergoes elastic deformation caused by a battery insertion into the battery housing chamber, and a restoring force of the pressing member presses the side surface of the battery.

9. The battery holding structure of claim 8, wherein the battery pressing member is formed on a side surface portion of the battery holder and is made of resin as a resin spring integrated with the battery holder.

10. A battery holding structure, comprising:

a battery holder which has a battery housing chamber which permits insertion and removal of a battery along a lengthwise direction thereof; and a battery fixing device which restrains the battery in a definite arrangement in the battery housing chamber by applying a force to the battery inserted into the battery housing chamber along a direction perpendicular to the lengthwise direction; wherein the battery fixing device includes a battery pressing member which exerts a force to a side surface of the battery in the battery housing chamber along the direction perpendicular to the lengthwise direction so as to press and fix the battery to an inner wall of the battery housing chamber;

the battery pressing member constituting the battery fixing device is arranged in a freely rotatable manner on the side surface portion of the battery holder; and the battery fixing device has a mechanism which displaces the battery pressing member to the releasing position and the locking position in conjunction with opening and closing operations of a battery chamber cap which is provided to open and close an insertion opening of the battery housing chamber.

* * * * *